US009924093B1

(12) United States Patent
Leizerovich et al.

(10) Patent No.: US 9,924,093 B1
(45) Date of Patent: Mar. 20, 2018

(54) METHOD AND APPARATUS FOR DISPLAYING PANORAMIC IMAGES

(71) Applicant: VSN TECHNOLOGIES, INC., Fort Lauderdale, FL (US)

(72) Inventors: Gustavo Leizerovich, Aventura, FL (US); Guillermo Padin, Jr., Coral Springs, FL (US)

(73) Assignee: HOYOS INTEGRITY CORPORATION, San Juan, PR (US)

( * ) Notice: Subject to any disclaimer, the term of this patent is extended or adjusted under 35 U.S.C. 154(b) by 361 days.

(21) Appl. No.: 14/701,873

(22) Filed: May 1, 2015

(51) Int. Cl.
  *H04N 7/00* (2011.01)
  *H04N 5/232* (2006.01)
(52) U.S. Cl.
  CPC ..... *H04N 5/23238* (2013.01); *H04N 5/23293* (2013.01)
(58) Field of Classification Search
  CPC .............. H04N 5/23238; H04N 5/23293
  USPC .......................................... 348/36
  See application file for complete search history.

(56) References Cited

U.S. PATENT DOCUMENTS

| 2012/0265621 | A1* | 10/2012 | Sechrist | ............. | G06Q 30/0241 |
| | | | | | 705/14.73 |
| 2013/0141524 | A1* | 6/2013 | Karunamuni | ......... | G06T 3/4038 |
| | | | | | 348/38 |
| 2013/0326419 | A1* | 12/2013 | Harada | ............... | G06F 3/04817 |
| | | | | | 715/838 |

* cited by examiner

*Primary Examiner* — Allen Wong
(74) *Attorney, Agent, or Firm* — Patents on Demand P.A.; Brian K. Buchheit

(57) ABSTRACT

A display device renders a field of view of a panoramic image that is produced from several separate images taken by different cameras. The field of view can be panned across the panoramic image. The separate images each show a portion of a panoramic view and border other images. When rendering a field of view that includes a border between two adjacent images, the images can be merged in a way that substantially eliminates the border and makes the view appear as one continuous image. The merging is performed only as needed, and border regions between images that are not in the rendered field of view are not merged so as to avoid using processing resources unnecessarily.

15 Claims, 6 Drawing Sheets

METHOD AND APPARATUS FOR DISPLAYING PANORAMIC IMAGES

FIELD OF THE DISCLOSURE

The present disclosure relates generally to circular or ring image processing where the ring image is produced by merging multiple images taken from different perspectives of a circular view, and more particularly to processing ring images in battery powered devices.

BACKGROUND

There are a number of camera devices on the market that produce a panoramic image, which is an image that includes a view which would require a person to pan their focus, such as by turning their head, in order to see everything presented in the image were the person looking from the same viewpoint. A conventional panoramic image can be produced by simply photographing one view, then turning the camera so that the camera's field of view now includes a view of things that could not be seen in the previous field of view, but is adjacent to the previous field of view. The resulting images can then be placed adjacent each other to provide a panoramic view. This conventional approach, however, suffers from "banding," where the images do not align in exposure or perspective since they each have their own perspective point. More recently cameras have been designed to take in light from a larger field of view, even in a 360 degree field of view. Such images are referred to as a circular or "ring" image, which is a panoramic image produced by capturing a view in a circle or semi-circle. Conventionally this is done by using multiple cameras, each aimed in a different orientation, to capture an image that represents one sector of the complete ring image. A similar technique can be used to present spherical images, which apply the same techniques in the vertical as well as the horizontal orientations. Circular and spherical images are presented in a field of view that can be moved along the horizontal or vertical axes to see in different directions. Given that the images are produced by separate cameras, however, the boundaries of the images present breaks in the composite panoramic image, and it is preferable to present a panoramic image as a continuous image when panning the field of view around the panoramic image.

To make a panoramic image appear continuous and unbroken despite the natural breaks that are present due to the fact that different sectors of the panoramic image are captured by independent cameras, a process called "stitching" is used to merge the edges of the separate images together, resulting in the appearance of a continuous image when the field of view is panned from image to adjacent image. Stitching, while conventional, is processor intensive. This is especially true when the images being merged are images of a video stream where the stitching must be performed for every new frame of images received in the video stream. In a mobile device used to view panoramic images and panoramic video, the amount of processing resources used to stitch images in a video stream represents a significant drain on battery charge.

Accordingly, there is a need for a method and apparatus for viewing panoramic images and video while minimizing the impact of stitching operations on battery charge and processor resources in general.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
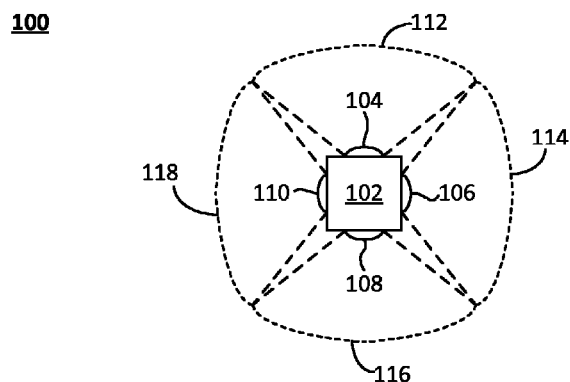
FIG. 1 is a top view of a panoramic camera system that captures a panoramic composite image that is made up of a plurality of images that border each other, in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments of the present disclosure allow the rendering of portions of a panoramic view as captured by a panoramic camera system using a plurality of cameras. Each camera captures a different portion of the panoramic view and produces and independent image that captures a view that is adjacent at least one other view of the entire panoramic view. Where these images border each other, if viewed as separate images, would be obvious, but methods for merging such images are used so as to substantially remove the appearance of image borders when rendering panoramic views from multiple independent images. The process of merging images can be processor intensive.

To alleviate the demand of processing resources in a device rending a field of view (i.e. a portion) of a panoramic view, embodiments include a method of displaying a panoramic image that includes receiving, at a display device, a plurality of images that form a panoramic composite image, wherein adjacent ones of the plurality of images border each other. The method can further include displaying, on the display device, a field of view that shows a portion of the panoramic composite image that does not include at least one border between two of the plurality of images. Since the field of view can only show a portion of the panoramic view, portions of the panoramic view will necessarily lie outside the rendered field of view. The method can further include the display device avoiding merging the two images having the at least one border that is not included in the field of view, thereby conserving processing resources as well as energy resources that would be consumed by use of the processing resources.

Embodiments can further include a display device having a display coupled to a display controller. The display controller renders image data on the display. The display controller in particular renders a field of view that shows a portion of a panoramic composite image comprised of a plurality of images. Adjacent ones of the plurality of images border each other, and the display controller merges adjacent images on an as needed basis when the border between the adjacent images is to be shown in the field of view to be rendered. The display controller avoids merging images having a border that is not included in the field of view to be rendered.

Embodiments can also include a method of processing panoramic image data of a panoramic image on a display device that facilitates panning a field of view across the panoramic image, where the panoramic image is comprised of a plurality of independent images. Such a method includes determining whether a border of two adjacent images of the plurality of independent images will be in a field of view to be rendered by the display device, and determining a rate of change of position of the field of view with respect to the panoramic image. The method further includes, when the border of two adjacent images will be in the field of view to be rendered, and when the rate of change of position of the field of view is below a threshold rate, merging the two adjacent images at the border. The method further includes avoiding merging images of the plurality of independent images at borders that will not be in the field of view to be rendered.

FIG. 1 is a top view 100 of a panoramic camera system 102 that captures a panoramic composite image that is made up of a plurality of images that border each other, in accordance with some embodiments. A panoramic image in general is an image of a wide view, beyond that which a person could see without aid and without turning (panning) their view or which is otherwise made up of several fields of view in different orientations. A panoramic composite image is a panoramic image made up of several images taken in different orientations where the edges of the images of adjacent orientations border each other and can overlap. The panoramic composite image is produced by arranging the adjacent images in order corresponding to their perspective orientation to give the appearance of a continuous image. In digital imaging the borders can be merged to substantially eliminate visual evidence of the border using a process known in the art as "stitching." As such, a panoramic composite image can be produced by a plurality of cameras arranged so as to each capture a portion of a view, where each portion is an image that visually borders an image produced by an adjacent camera. The cameras can be oriented in a line, an arc, a semi-circle, a circle, a sphere, and other arrangements. The panoramic composite images can be still images, produced by still cameras that each capture their respective image at the same instant or it can be a video created by a stream of images from the plurality of cameras.

The panoramic camera system 102 is an example of a camera designed to produce a circular panoramic image. Accordingly, the panoramic camera system 102 includes a plurality of cameras 104, 106, 108, 110 that are each oriented in a different direction to capture images in different orientations around the panoramic camera system 102. For the sake of clarity, the disclosure will focus on a circular panoramic image but those skilled in the art will appreciate that the same techniques apply to spherical panoramic images as well. The four cameras 104-110 each capture an image of views 112, 114, 116, 118, respectively, in a corresponding sector of the circle around the panoramic camera system 102. The images sensors used by the cameras 104-110 can be rectangular so as to produce a rectangular image.

Figure 2:
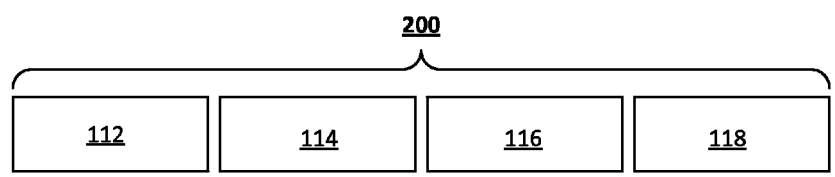
FIG. 2 shows a panoramic composite image that is made up of a plurality of images that border each other, in accordance with some embodiments.
Figure 3:
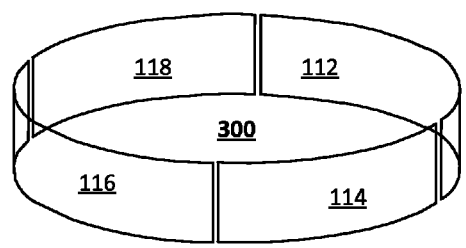
FIG. 3 shows a panoramic composite image in a circular arrangement, in accordance with some embodiments.

FIG. 2 shows a panoramic composite image 200 that is made up of a plurality of images of views 112-118 produced by the panoramic camera system 102 of FIG. 1. The images as shown are arranged linearly and border each other. Thus, where the image containing view 112 ends on its right side is where the view 114 begins on its left side. The right edge of view 118 borders the left edge of view 112. The image containing view 112 is therefore adjacent the images containing views 114 and 118, on opposite sides of the image containing view 112. Since views 112 and 118 are adjacent, the panoramic image 200 is a circular image is illustrated in FIG. 3, which shows a panoramic composite image in a circular arrangement 300, in accordance with some embodiments. The circular arrangement 300 represents the panoramic image taken by a circular camera system such as panoramic camera system 102. For a spherical panoramic image, images would be taken above and/or below images 112, 114, 116, 118.

To create a panoramic image from views 112-118, the respective images would conventionally be merged at each border by stitching. However, using a display device, and particularly a battery powered mobile display device such as a cellular telephone device, merging is generally not performed unless a border region is in a present field of view being viewed on the display device. By not performing the merging unless needed when a border region is in the field of view, processing is conserved, and therefore battery charge is conserved. The savings can be substantial, particularly when the panoramic image is a panoramic video image. In some embodiments when the field of view is panned quickly, and a border region passes through the field of view of the display device, merging of adjacent images can be avoided since the border region will only be in the field of view momentarily as it passes through the field of view.

Figure 4:
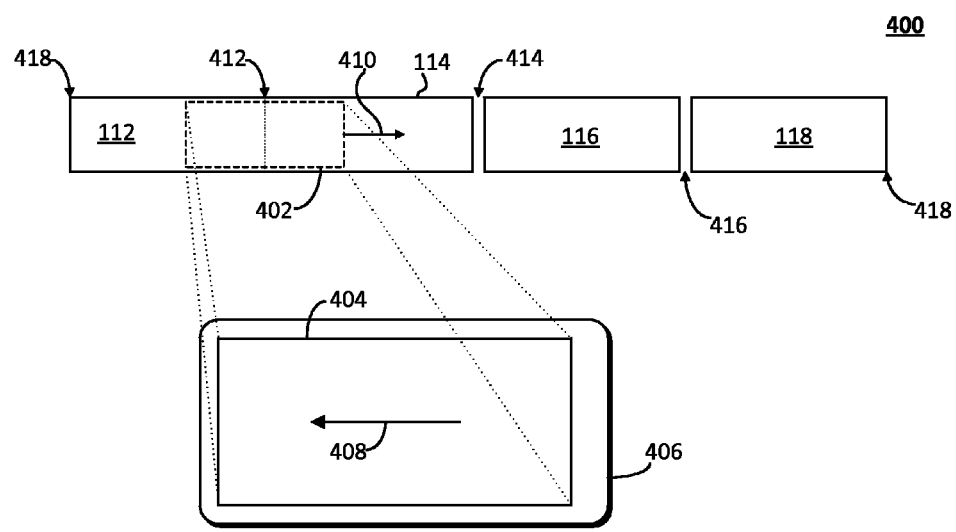
FIG. 4 shows a view diagram for a display of a portion of a panoramic composite image on a mobile device where borders of individual images not in a field of view are not merged, in accordance with some embodiments.

FIG. 4 shows a view diagram 400 for a display of a portion of a panoramic composite image on a mobile device where borders of individual images not in a field of view 402 are not merged, in accordance with some embodiments. The panoramic composite image is comprised of a plurality of images including views 112, 114, 116, and 118. Between these adjacent views are borders 412, 414, 416, and 418 (between views 118 and 112). The field of view 402 corresponds to a display 404 (or a portion thereof) of a display device 406. The display 404 is a graphical display using a conventional display technology such as, for example, light emitting diode (LED) or organic light emitting diode (OLED). The display device 406 is generally a battery powered device, and can be, for example, a cellular telephone device, a tablet computer device, a laptop computer device, and so on. The display device 406 can be linked to a panoramic camera to receive images as they are generated to provide a live panoramic video view. The field of view 402 can be displayed on the entire display 404 or a portion of the display 404, and represents the area of the panoramic image (comprised of views 112-118) being viewed on the display 404 of the display device 406. Since the field of view 402 include border 412, the display device 406 merges the images for views 112, 114 at their adjacent boundaries at border 412. Thus, border 412 is represented as a thin dashed line to indicate that the break that would normally be visible between views 112 and 114 by virtue of being on different images is significantly removed by merging the images (e.g. stitching). However, the adjacent images at borders 414, 416, and 418, since they are not in the field of view 402, are not merged. As a result of not merging images whose borders are not in the field of view 402, battery charge is conserved over the conventional method of merging images at all borders all the time. This is especially true when the panoramic image is a video image, and the images being received by the display device 406 are successive frames of a panoramic video stream.

Figure 5:
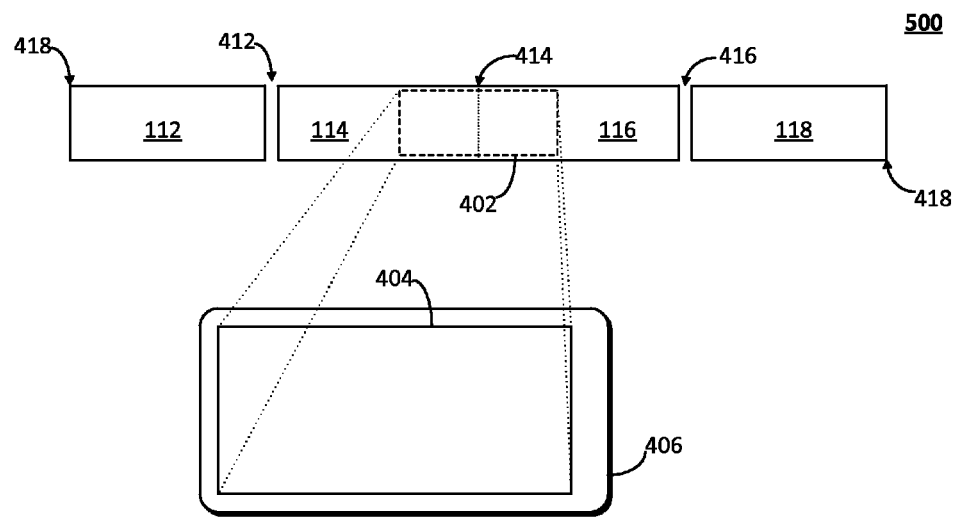
FIG. 5 shows a view diagram for a display of a portion of a panoramic composite image on a mobile device where borders of individual images not in a field of view are not merged, in accordance with some embodiment.

It is common to pan a field of view of something being displayed, such as scrolling through a document. The same can be applied to a panoramic image where, for example, a user can swipe their finger in the direction of arrow 408 on display 404, which senses touch input in a conventional manner. As a result of the swipe 408, the field of view 402 is moved along the panoramic image in the direction of arrow 410. Thus, a user can pan the field of view 402 from its location in FIG. 4 to the location shown in FIG. 5, which shows a view diagram 500 for a display of a portion of a panoramic composite image on a mobile device where borders of individual images not in a field of view are not merged, in accordance with some embodiment.

In view diagram 500, the field of view 402 is located along the panoramic image so as to include border 414. Assuming the panoramic image (comprised of individual images for views 112-118) is part of an image for a video stream, on the images at border 414 are merged, and merging is not performed at borders 412, 416, or 418. When no border is present in the field of view 402, and the field of view 402 is not moving (relative to the panoramic image), then no merging of images is performed. In some embodiments, as the field of view 402 is moved, such as by panning the field of view 402 through touch input as shown in FIG. 4 (e.g. arrow 408), the display device 406 can, based on the rate of movement of the field of view 402 predict that a border will come into the field of view, whereupon the display device 406 can commence merging the corresponding adjacent images at the border that will come into the field of view 402 prior to the border being in the field of view 402. Thus, as the field of view is panned along or around the panoramic image, it appears to be a continuous image even though merging is not being performed at the borders that are not in view in the field of view 402. In the case where a spherical panoramic image is being presented, then additional images above and/or below images 112, 114, 116, and 118 would also be taken, and can likewise be merged with their adjacent images, only instead of just the vertical borders being merged, then the horizontal borders of images that are vertically adjacent would be merged as well when in the field of view being presented.

Figure 6:
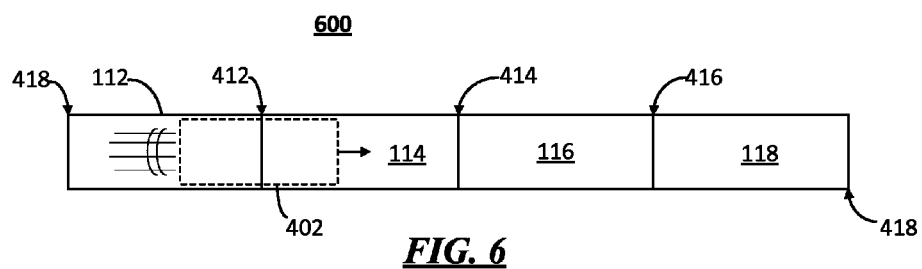
FIG. 6 shows a view diagram for movement of a field of view of a portion of a panoramic composite image in a rapid manner where the individual images are not merged, in accordance with some embodiments.

FIG. 6 shows a view diagram 600 for movement of a field of view 402 across a panoramic composite image in a rapid manner where the individual images are not merged, in accordance with some embodiments. The field of view 402 is moved responsive to user input, such as by swiping on a touch-enabled display screen. It is common for the rate at which a user's finger is swiped across the touch-enabled display screen to be used to adjust the speed at which something being displayed is scrolled on the display. If the panoramic image is being panned at a rate faster than a preselected threshold rate, then merging of borders that pass across the screen can be avoided since the user will not have time to substantially perceive them. Thus, in view diagram 600, border 412 passes through the field of view, but the display device does not attempt to merge the images containing views 112, 114 at border 412. Likewise, at the rate of panning, borders 414, 416, which might get merged if the panning were slower as a predictive measure, are also not merged. However, if the user stops the panning such that the field of view 402 includes, for example, border 412, then the images of views 112, 114 are merged at border 412 to substantially remove the border such as by stitching.

Figure 7:
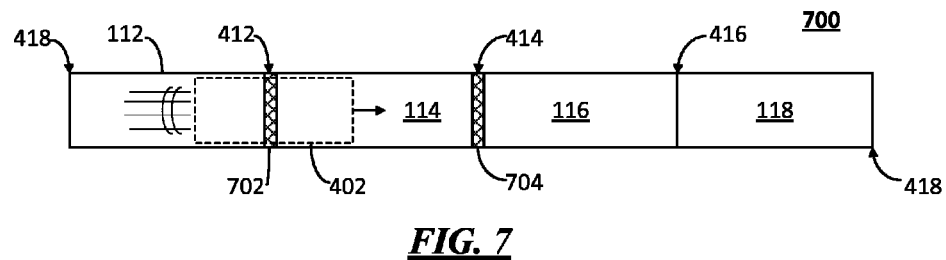
FIG. 7 shown a view diagram for movement of a field of view of a portion of a panoramic composite image in a rapid manner where the individual images are not merged, and borders are filled with a substitute artifact, in accordance with some embodiments.

FIG. 7 shows a view diagram 700 for movement of a field of view 402 of a portion of a panoramic composite image in a rapid manner where the individual images are not merged, and borders are filled with a substitute artifact, in accordance with some embodiments. As an alternate to simply not merging borders when they pass through the field of view 402 at a rate faster than the preselected threshold rate, where a line or other visual artifact may be perceived momentarily as the border 412 passes through the field of view 402, some substitute artifact 702, 704 can instead be inserted over the borders 412, 414, respectively. The substitute artifact can be, for example, a gradient having colors selected from the edges of the images adjacent the border to somewhat blend the images together when perceived upon the border passing quickly through the field of view 402. In some embodiments the can be two preselected rate thresholds: a first one where a gradient is used at the border(s) passing through the field of view, and a second, faster rate threshold where the border is unchanged, and where below the first rate threshold the display device performs merging of the images adjacent borders passing through the field of view 402.

Figure 8:
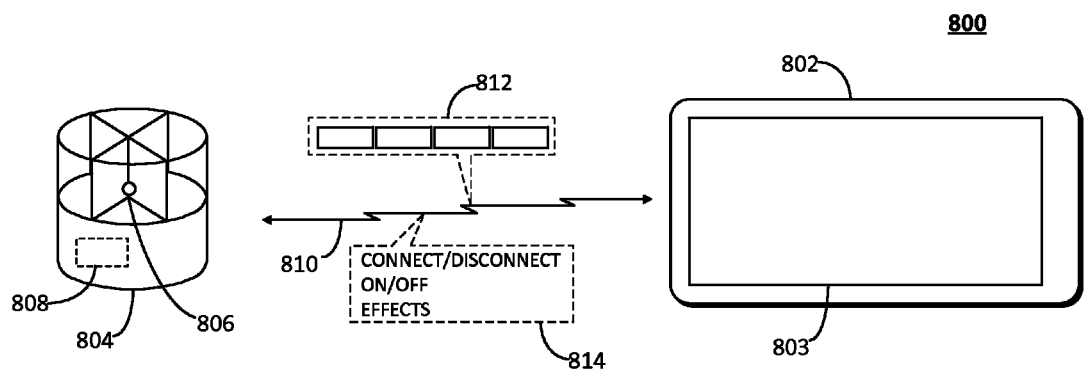
FIG. 8 shows a camera and display system in accordance with some embodiments.

FIG. 8 shows a camera and display system 800 in accordance with some embodiments. A display device 802 includes a display 803 which is a graphical display that is capable of displaying images, video, and other pictographic media, as is known. The display device 802 can be, for example, a tablet device, a cellular telephone device, a computer and display system, and so on. The system 800 further includes a panoramic camera 804 that comprises a plurality of cameras, such as camera 806, to capture images of different portions of a panoramic view. The panoramic camera 804 includes various image processing hardware and software to process images produced by the plurality of cameras, and a wireless transceiver 808. The wireless transceiver 808 uses radio communication and can operate according to a known short range wireless communication protocol such as, for example, the Institute of Electrical and Electronic Engineers (IEEE) specification 802.11 or IEEE 802.15, among other known such communication protocols. A communication link 810 can be established between the panoramic camera 804 via the wireless transceiver 808 and the display device 802 (using a similar wireless transceiver) in accordance with the wireless communication protocol. The panoramic camera 804 can send image date 812 to the display device 802, and the display device 802 can send control and command information 814 to the panoramic camera 804 over the communication link 810. Accordingly, the display device 802 can, for example, execute a computer program application that allows control of the panoramic camera 804, and which processes image data received from the panoramic camera 804 in accordance with the disclosure herein. Typical control commands that can be issued by the display device 802 to the panoramic camera 804 can include, for example, wirelessly connecting or disconnecting the communication link 810, turning the panoramic camera on or off, turning on or off visual effects in the camera when capturing image data, and so on.

Although shown here as using a wireless communication link to transmit images from the cameral to the display device, it will be appreciated by those skilled in the art that other arrangements can be used. For example, in some embodiments the cameras and display can be integrated into a single device, and the images are received from the cameras internally, which can write image data directly into designated memory locations. In some embodiments the cameras and display device can each be discrete units that are connected via a cable of electrical conductors or an optical fiber.

Figure 9:
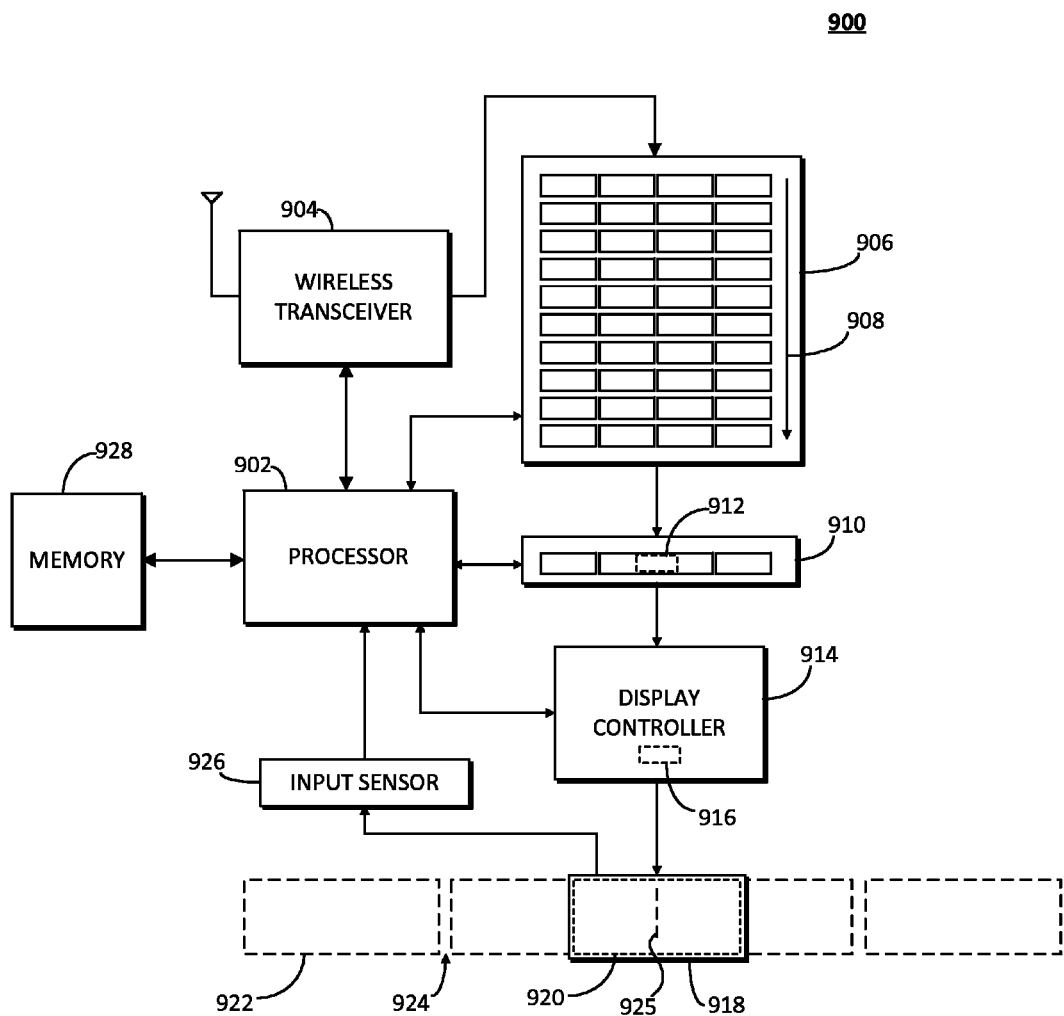
FIG. 9 shows a block diagram of a display device that display panoramic composite images in accordance with some embodiments.

FIG. 9 shows a block diagram schematic of a display device 900 that displays panoramic composite images in accordance with some embodiments. The display device 900 includes a processor 902 that generally controls operation of the display device 900 by executing program code that can be instantiated in memory 928, for example. Memory 928 can represent an aggregate memory which is comprised of read only memory (ROM), random access memory (RAM), rewritable bulk storage memory, and so on, as necessary for a particular application. The processor 902 is coupled with a wireless transceiver 904 that is capable of short range wireless communication according to a communication protocol. The wireless transceiver 904 includes radio circuitry for amplification, filtering, modulation, demodulation, and frequency synthesis of radio frequency signals, as well as data buffering for data being transmitted and data being received.

Image data received by the wireless transceiver 904 can be transferred to an image buffer 906 which is comprised of memory elements for storing image data. The image data can be received in frames, each frame including a plurality of images making up a panoramic composite image taken by a panoramic camera. That is, each frame includes one image from each camera of the panoramic camera system, where each image in the frame is taken at substantially the same time. The frames can be intended to be viewed as "still" pictures, or they can be viewed as a panoramic video stream. When a frame is to be viewed, it (or a copy) is moved to a frame buffer 910 where the present position of a field of view 912 relative to the frame or panoramic image is determined. The position can be a default position when viewing still panoramic images, which can then be panned across the panoramic image responsive to user input. For video, the relative location of the field of view 912 can be tracked in time since it can be moved by user input during the streaming of panoramic video images. The processor 902 or other suitable processing unit can be responsible for determining the present location of the field of view 912. A display controller 914 can render the image data 916 corresponding to the field of view 912 on a display 918. The rendered field of view 920 on the display 918 can include image data of two or more images of a frame, and thus the borders of those images can be merged by the display controller 914 in producing the rendered field of view 920. Image data not in the field of view 912, such as image 922, are not in rendered field of view 920. Likewise, borders such as border 924 which are not in the field of view 912 are not merged since they will not be shown in rendered field of view 920. A border that would be in the rendered field of view 920, however, such as border 925, is eliminated by merging the images on either side of the border 925. By not merging images at borders that are not in the rendered field of view 920, or which will be panned through the rendered field of view 920 too quickly, the display device 918 conserves power that would otherwise be used by the display device 918 if merging is performed at all borders regardless of whether they will be in the field of view.

To change the position of the field of view 912, and input sensor 926 can, for example, detect touch input such as swiping on the display 920 of the display device 918, indicating the direction and speed with which the user wishes to change the field of view 912. The display 920 can be a touch input display that senses touch input provided by a user (e.g. a finger or stylus). Touch input information can be provided to the processor 902 by the input sensor 926 and used to adjust a position of the field of view 912 relative to the panoramic image. In some embodiments the input sensor can sense other forms of navigational input, such as, for example, input received via directional buttons on the display device 918.

Figure 10:
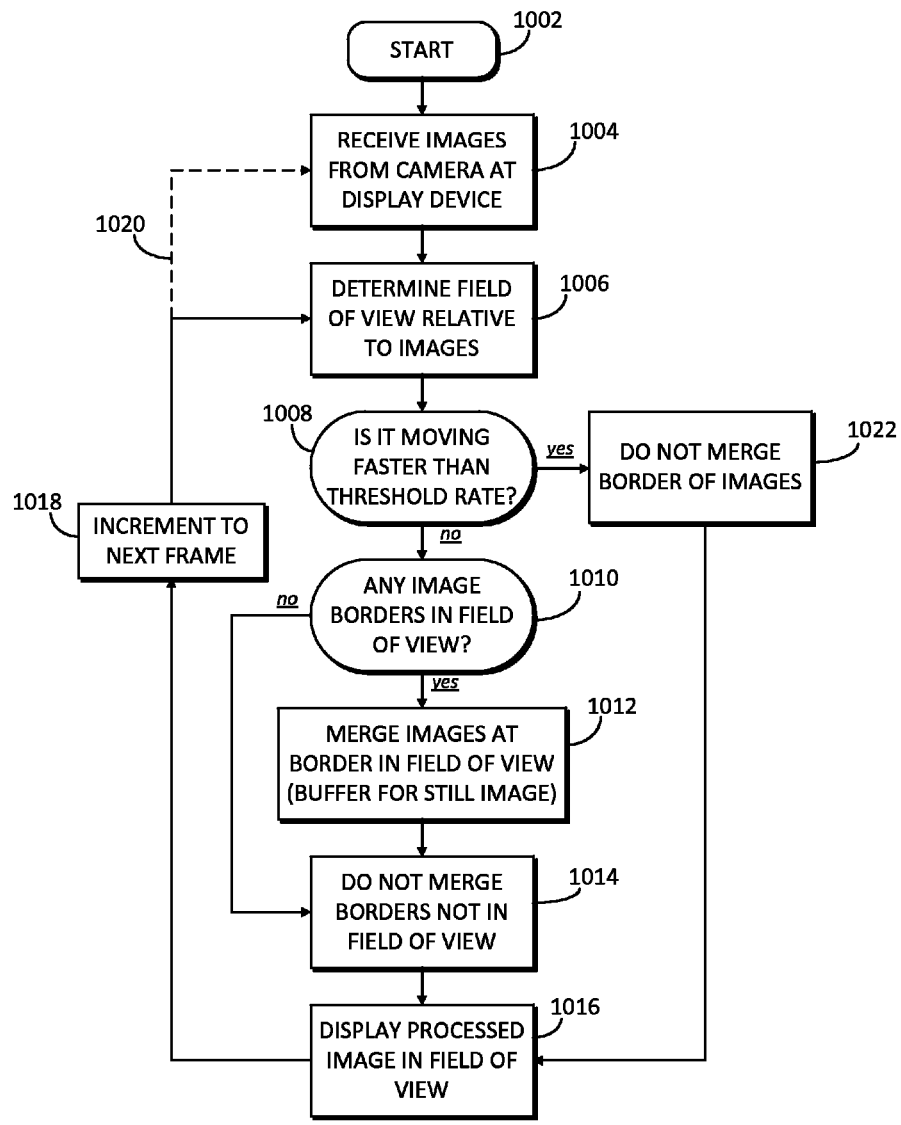
FIG. 10 shows a flow chart of a method for displaying panoramic composite images, in accordance with some embodiments.

FIG. 10 shows a flow chart of a method 1000 for displaying panoramic composite images, in accordance with some embodiments. At the start 1002 the panoramic camera and display device are powered on and have a communication link, wireless or otherwise. In step 1004 the display device receives images from the panoramic camera. The images are received in units (e.g. frames) that make up a panoramic image when rendered together. However, in step 1006 since the region of the panoramic image that is actually rendered is less than the entire panoramic image the display device must determine the location of the field of view relative to the images that will be rendered. In step 1008 the display device can determine whether the field of view is being panned faster than a threshold rate across the panoramic image. If the rate of change of the field of view is less than the threshold rate, the method proceeds to step 1010 where the method 1000 determines whether any borders will be in the field of view when rendered. If there is an image border in the field of view in step 1010, then the method proceeds to step 1012 where the images adjacent the border are merged to substantially remove the appearance of an image border in the rendered field of view. Merging the images is performed, for example, by a stitching process performed on the image data in an image buffer or memory location in which image data that is to be rendered (i.e. in the field of view) is stored for processing before being rendered.

If in step 1010 there are no image borders in the field of view, or after merging images in step 1012, the method proceeds to step 1014 by not merging images at image borders not in the field of view, or not expected to be in the field of view very soon due to panning of the field of view across the panoramic image. In step 1016 the processed image data is rendered in the field of view as presented on the display of the display device. Likewise, if in step 1008, the field of view is being panned across the panoramic image at a rate greater than the threshold rate, then in step 1022 the display device does not merge any of the images, including at borders that are in the rendered field of view, and the method proceeds to step 1016 where the image date in the field of view is rendered without merging the images at image borders in the field of view. After rendering the image for the present field of view, the method can proceed to step 1018 and increment processing to a next frame of image data, or to a next field of view if the field of view of being panned across a still panoramic image, and return to step 1006 to determine the position of the next field of view to be rendered. As indicated by dashed line 1020, the display device can also continue to receive images from the panoramic camera.

In general, the display device receives images from a panoramic camera that make up a panoramic image. The panoramic image can be a still image or a stream of image frames that make up a video stream. In both cases the resulting panoramic image is created by merging adjacent images in a field of view. The field of view is a section of the panoramic image being displayed that is less than the entire panoramic image, and which can be panned across the panoramic image to view different portions or orientations of the complete view of the panoramic image. To conserve energy usage, the display device does not perform processing functions to merge images in portions of the panoramic image that are not in the present field of view.

Figure 11:
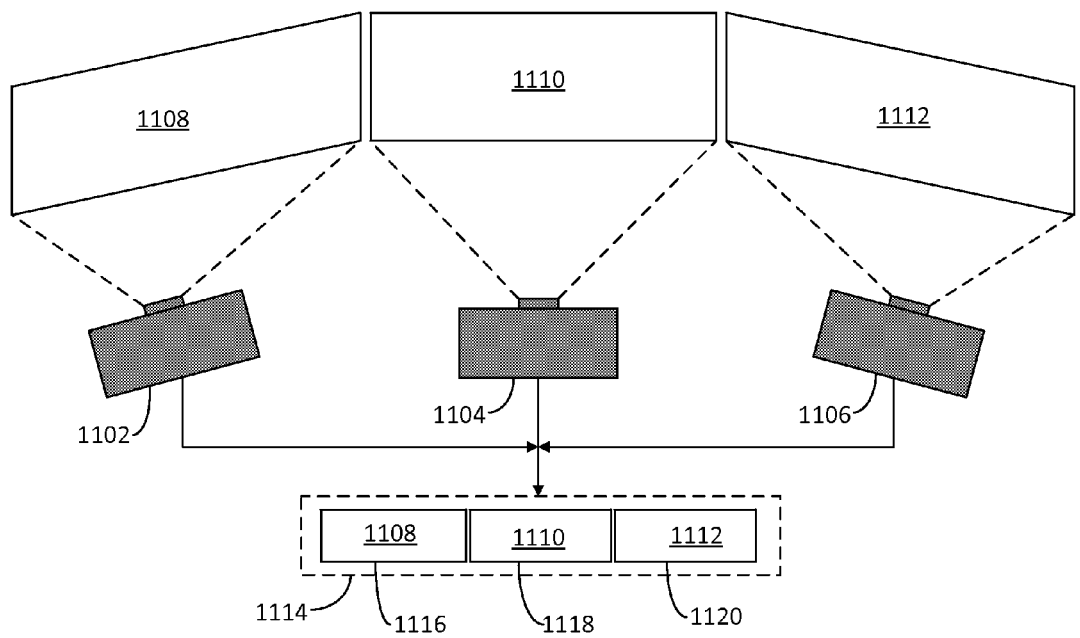
FIG. 11 shows an alternate camera system for producing a panoramic composite image, in accordance with some embodiments.

FIG. 11 shows an alternate camera system 1100 for producing a panoramic composite image, in accordance with some embodiments. Although some embodiments described so far have been focused on circular panoramic images, panoramic images can be produced in other formats. The camera system 1100 produces a panoramic image 1114 using three cameras 1102, 1104, 1106, each oriented to capture a different portions 1108, 1110, 1112, respectively, of a panoramic view. The cameras produce images 1116, 1118, 1120, respectively corresponding to respective views 1108, 1110, 1112. The images 1116, 1118, 1120 make up the panoramic composite image 1114. Images 1116 and 1118 are adjacent each other and share a border, as do images 1118 and 1120. When processed by a display device in accordance with embodiments of the disclosure the images are merged when any of the borders would be in the rendered field of view to substantially eliminate the appearance of the border in the rendered field of view.

Accordingly, by selectively merging only images where a border is in a present field of view, or not merging any images when the field of view is being panned quickly, the display device avoids unnecessary processing and conserves battery energy. Furthermore, when the display device is a more general purpose or multi-purpose device, such as a cellular telephone device, a table computer device, or a laptop computer device, for example, by determining when and which image merging processing can be avoided the processing resources are available for other processing task not related to presentation of the panoramic image in the rendered field of view. That is, it is quite common on such devices to have several unrelated applications or programs running concurrently with the processor having to allocate processing resources among the different tasks in time. Thus, by only merging images when a border would otherwise be seen in a rendered field of view, processing resources are then available for other task being concurrently performed by the display device compared to the prior art methods where all image borders are merged and stored regardless of whether they will be present in a rendered field of view.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A method of displaying a panoramic image in an electronic device having a display, comprising:
   receiving, at the electronic device, a plurality of images that form a panoramic composite image and wherein adjacent ones of the plurality of images border each other;
   displaying on the electronic device a field of view that shows a portion of the panoramic composite image that does not include at least one border between two of the plurality of images;
   the electronic device avoiding merging the two images having the at least one border that is not included in the field of view;
   wherein the field of view includes a border of two image of the plurality of image of the panoramic composite image, determining whether to merge the two images having the border in the field of view; and
   the electronic device inserting a gradient between the two images as the border between the two images is panned across the field of view of the electronic device in response to a determination to not merge the two images in the determining step.

2. The method of claim 1 wherein the field of view includes a border of two images of the plurality of image of a composite ring image, the method further comprising merging the two images having the border in the field of view.

3. The method of claim 1, wherein determining whether to merge the two images is based, at least in part, on a rate of panning the field of view by the electronic device across the panoramic composite image.

4. The method of claim 1, wherein receiving the plurality of images comprises receiving the plurality of images wirelessly at the electronic device.

5. The method of claim 4, wherein the plurality of images are images of a panoramic video stream.

6. An electronic device, comprising:
   a display;
   a display controller coupled to the display that renders image data on the display;
   the display controller renders a field of view that shows a portion of a panoramic composite image comprised of a plurality of images, wherein adjacent ones of the plurality of images border each other, and wherein the display controller merges adjacent images on an as needed basis when the border between the adjacent images is to be shown in the field of view to be rendered, and wherein the display controller avoids merging images having a border that is not included in the field of view to be rendered;
   wherein the display controller determines a rate at which the field of view is presently being panned across the panoramic image, and, responsive to the rate being greater than a threshold rate, the display controller does not merge images in the rendered field of view and inserts a gradient between adjacent images in the rendered field of view when the rate is faster than the threshold rate.

7. The electronic device of claim 6, wherein the electronic device further comprises a wireless transceiver via which the electronic device receives the plurality of images.

8. The electronic device of claim 6, wherein the plurality of images are a portion of a video stream being rendered by the electronic device.

9. The electronic device of claim 6, including an input that, when operated by a user, causes the field of view to be moved relative to the panoramic image.

10. The electronic device of claim 6, wherein the display controller processes the images as a spherical panoramic image.

11. A method of processing panoramic image data of a panoramic image on an electronic device that facilitates panning a field of view across the panoramic image, where the panoramic image is comprised of a plurality of independent images, the method comprises:
    determining whether a border of two adjacent images of the plurality of independent images will be in a field of view to be rendered by the electronic device;
    determining a rate of change of position of the field of view with respect to the panoramic image;
    responsive to the rate of change of position of the field of view being above the threshold rate, avoiding merging the two adjacent images determined to be in the field of view to be rendered by the electronic device and inserting a gradient between the two adjacent images; and
    avoiding merging images of the plurality of independent images at borders that will not be in the field of view to be rendered.

12. The method of claim 11, further comprising receiving the plurality of independent image from a remotely located panoramic camera system.

13. The method of claim 12, wherein receiving the plurality of independent image from the remotely located panoramic camera system is performed wirelessly using a wireless transceiver of the electronic device, and wherein the plurality of independent images are received via a wireless link in accordance with a wireless communication protocol.

14. The method of claim 12, wherein receiving the plurality of independent image from the remotely located panoramic camera system comprises receiving a video stream from the remotely located panoramic camera system, the video stream including a plurality of frames where each frame of video includes a plurality of independent images taken by the panoramic camera system in different respective orientations of a panoramic view.

15. The method of claim 11, further comprising determining a location of a present field of view relative to the panoramic image.

* * * * *